United States Patent [19]

Zeller et al.

[11] Patent Number: 5,393,589

[45] Date of Patent: Feb. 28, 1995

[54] APPARATUS AND METHOD FOR VARIABLY KNURLING EDGES OF WEB AND PRODUCT PRODUCED THEREBY

[75] Inventors: John J. Zeller; Robert C. Brown, both of Rochester; Zbigniew Hakiel, Webster; Allan T. Hoy, Clarkson; Arthur M. Stewart, Victor, all of N.Y.

[73] Assignee: Eastman Kodak Company, Rochester, N.Y.

[21] Appl. No.: 904,103

[22] Filed: Jun. 24, 1992

[51] Int. Cl.⁶ .................. B32B 23/02; B28B 17/00; B06B 1/02; B29C 49/00

[52] U.S. Cl. .................. 428/192; 428/141; 428/156; 428/212; 428/906; 264/23; 264/167; 264/284; 264/293; 425/141; 425/174.2; 425/299; 425/365

[58] Field of Search ............... 428/156, 167, 192, 906, 428/141, 212; 264/162, 167, 175, 184, 23, 284, 293; 156/73.1, 209; 425/140, 141, 174.2, 299, 363, 365, 385

[56] References Cited

U.S. PATENT DOCUMENTS

| | | | |
|---|---|---|---|
| 2,335,746 | 11/1943 | Eckler | 117/34 |
| 3,160,687 | 12/1964 | Andrews | 264/25 |
| 3,502,765 | 3/1970 | Spencer | 264/230 |
| 3,539,344 | 11/1970 | Russell | 96/67 |
| 3,635,609 | 1/1972 | Balamuth | 425/3 |
| 3,749,006 | 7/1973 | Loose | 101/3 |
| 3,890,892 | 6/1975 | Loose et al. | 101/32 |
| 3,955,740 | 5/1976 | Shoh | 228/1 |
| 4,021,179 | 5/1977 | Pira | 425/369 |
| 4,185,068 | 1/1980 | Schmidt et al. | 264/284 |
| 4,234,300 | 11/1980 | Yamagisi et al. | 425/363 |
| 4,247,273 | 1/1981 | Pogrzeba et al. | 425/174.2 |
| 4,942,000 | 7/1990 | Penoyer | 264/22 |

*Primary Examiner*—Donald J. Loney
*Attorney, Agent, or Firm*—Charles E. Snee, III

[57] ABSTRACT

Webs are provided with edge knurls whose effective height varies along the length of the web in a predetermined manner.

41 Claims, 4 Drawing Sheets

APPARATUS AND METHOD FOR VARIABLY KNURLING EDGES OF WEB AND PRODUCT PRODUCED THEREBY

DESCRIPTION

Technical Field

The invention concerns apparatus and methods for knurling the edges of a web prior to winding and web products provided with such knurling. More particularly, the invention relates to such apparatus, methods and web products in which the effective height of the knurling varies in a predetermined manner along the length of the web in order to minimize the occurrence of certain irregularities during winding. As used in this specification, "knurling" refers to processes for producing a regular or irregular, constant or varying pattern of protuberances, bumps, raised lines or similar raised features on one or both sides of a web; and "knurl" refers to such patterns. As used in this specification, "compressibility" refers to the ease with which such patterns can be compressed; so that, "high compressibility" knurls are more easily compressed than "low compressibility" knurls. As used in this specification, "effective height" refers to the increased radial spacing of roll convolutions in the knurled areas, as compared to the radial spacing in unknurled areas.

Background Art

During the manufacture of various types of web materials such as photographic film base, longitudinally extending knurl patterns frequently are provided along the length of the web at one or both edges. Such knurl patterns are areas of the web near its edges where the web has been functionally thickened by a mechanical embossing process, for example, such as that shown in commonly assigned U.S. Pat. No. 3,502,765. The use of knurl patterns at the edges of the web, hereinafter referred to as "edge knurls", reduces or eliminates several commonly recognized quality problems related to winding of such webs, including hard streaks caused by transverse variations in the thickness of the web which persist over a considerable length; pressure damage to coatings on the web due to contact between convolutions of the wound web; surface skidding of convolutions over one another due to air entrainment into the roll during winding; and core impressions due to the edge of the end of the web and any tape used to attach the web to the winding core.

The edge knurls provide an increased radial spacing between the convolutions of the roll which helps to reduce the severity of such recognized problems. However, when a web of photographic film base, for example a web having a width in the range of 40 to 60 inches (102 to 152 cm) and a thickness in the range of 0.004 to 0.006 inch (0.010 to 0.015 cm), is wound into a roll of greater than about 18 inches (45.72 cm) diameter, certain additional quality problems may be introduced, including excessive distortion of the web in and near the edge knurls; buckling collapse of the wound roll in the area between the edge knurls; and shifting or telescoping of the wound roll. One of the reasons for these additional quality problems is that the edge knurls on each convolution build up on the edge knurls of the preceding convolutions as winding proceeds. At rather large roll diameters, when many convolutions have been wound, the build up is high and contributes to the additional problems; so that, effectively thinner edge knurls would be desirable. On the other hand, if the thickness of the edge knurls is fixed at a lower value to minimize build up near the outside of larger diameter rolls and thus reduce the additional problems, the recognized quality problems described in the preceding paragraph become worse, particularly near the core of the wound roll. Thus, a need has existed for an improvement in such edge knurls which would help to alleviate both the recognized and the additional quality problems.

SUMMARY OF THE INVENTION

The apparatus and methods of the invention are useful for variably knurling the edges of a web of sheet material such as photographic film base. A web having longitudinal edges is conveyed along a path. Along the longitudinal edges on one or both sides of the web is applied at least one longitudinally extending pattern of edge knurls having a height extended past the surface of the remainder of the web, the height or compressibility of the edge knurls varying along the length of the web in a predetermined manner. Preferably, the height of the edge knurls is greatest at the end of the web near the core of the roll and least near the outside convolution of the roll. Finally, the web is wound into a roll after application of the edge knurls. Variation in effective height is achieved either by varying the as-knurled height of the edge knurls; or by varying the density of the patterns of edge knurls to vary the degree of compression of the edge knurls when the roll is wound, thus varying the effective height. The pattern of edge knurls may be continuous or intermittent and the effective height may vary linearly or non-linearly or may be stepped. The edge knurls may be applied by hot or cold mechanical embossing, by laser knurling, by ultrasonic knurling, by corona discharge knurling and by any other suitable technique which will produce the desired change in effective height in accordance with a predetermined pattern. The effective height of the edge knurls may be proportional to the tension applied to the web during winding, which typically decreases as winding proceeds, or may be varied in a range of patterns as necessary to alleviate the quality problems otherwise introduced during winding. The article of manufacture of the invention comprises a web of material having edge knurls whose effective height varies along the length of the web in the manner just described.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
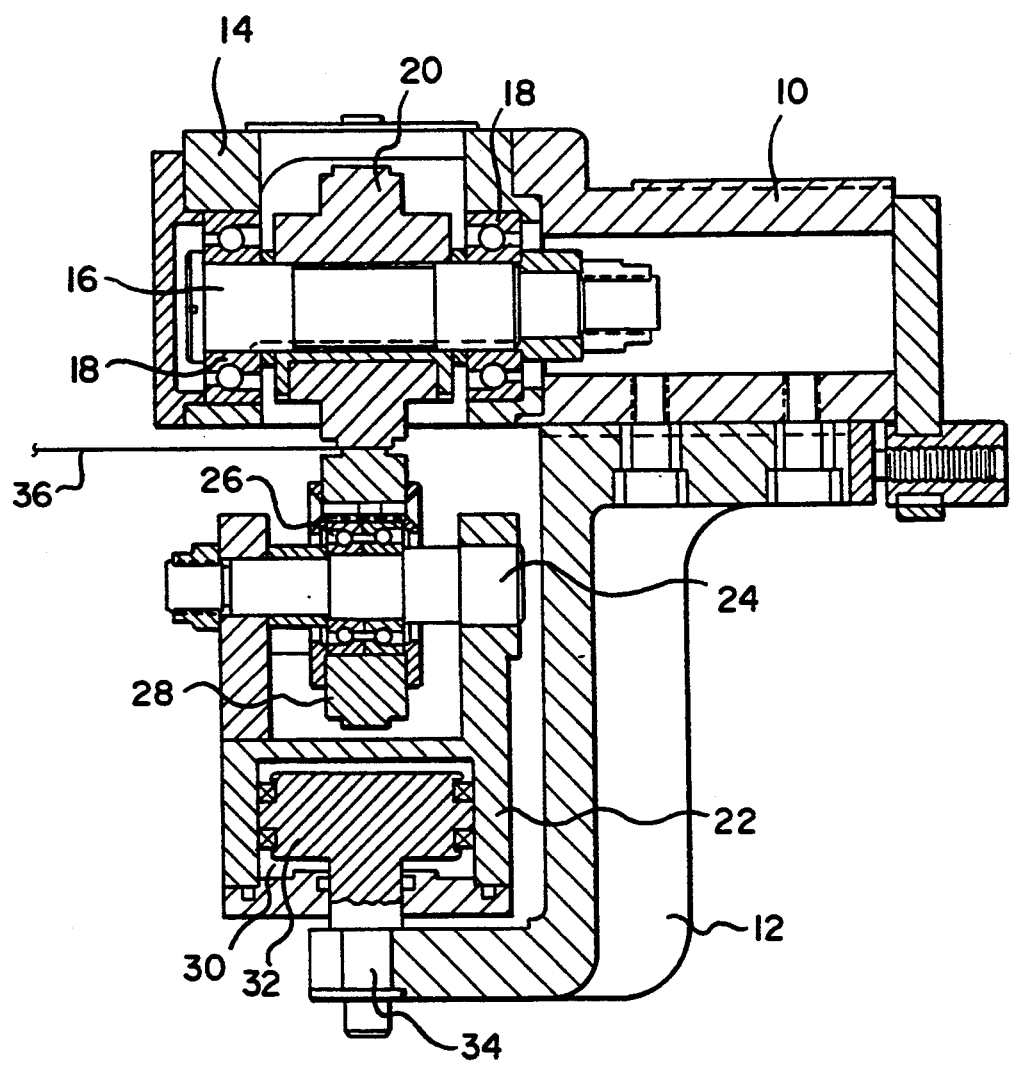
FIG. 1 shows a section view through a prior art knurling apparatus of a type useful in accordance with the invention.

The following is a detailed description of the preferred embodiments of the invention, reference being made to the drawings in which the same reference numerals identify the same elements of structure in each of the several Figures.

A prior art apparatus for knurling one of the edges of a web is illustrated in FIG. 1 in a sectional plan view. An opposite hand version would be provided to knurl the other edge of the web. A fixed base 10 supports an essentially horizontally extending bracket 12 and a knurl housing 14. Within housing 14, a shaft 16 is mounted for rotation within a pair of bearings 18. A knurling wheel 20 is fixed to shaft 16 and is provided in the known manner on its cylindrical outer surface with a pattern of peaks and indentations which will produce a knurl on the web.

Opposite knurling wheel 20, bracket 12 supports a cylinder body and knurl housing 22 by means of suitable guides such as ball bushings, not illustrated, which permit housing 22 to move toward and away from the axis of rotation of shaft 16. A shaft 24 is fixedly mounted to bracket 12 and centrally supports a pair of bearings 26 on which a knurling wheel 28 is mounted for rotation about shaft 24. Knurling wheel 28 typically will include a pattern of peaks and indentations to produce a knurl pattern in cooperation with knurling wheel 20; however, wheel 28 may also have a smooth exterior surface so that knurling will be produced on only one side of the web. Cylinder body and knurl housing 22 includes a pneumatic cylinder 30 within which is mounted a piston 32 having a rod 34 which is fixed to bracket 12. Suitable pneumatic connections, not illustrated, are provided to admit air to the head end of piston 32 to actuate the apparatus and to the rod end of piston 32 to release the apparatus.

In operation of the apparatus of FIG. 1, an edge 36 of a web product to be knurled is pulled between knurling wheels 20, 28. Pressurized air is admitted to the head end of piston 32, thereby causing cylinder body and knurl housing 22 to move toward knurl housing 14 until knurling wheels 20, 28 engage the opposite sides of the web product. Sufficient air pressure is applied to emboss edge 36 with the desired knurling height as the web product is pulled between the knurling wheels. To stop knurling, pressurized air is admitted to the rod end of piston 32 and released from the head end, thereby causing cylinder body and knurl housing 22 to move away from knurl housing 14 until knurling wheels 20, 28 no longer engage edge 36. The prior art practice with such an apparatus has been to maintain an essentially constant pressure at the head end of piston 32 during knurling, so that a knurling pattern of substantially constant thickness and properties is produced along the web, leading to the additional quality problems previously discussed when larger rolls am wound.

In accordance with a preferred embodiment of the invention, the compressibility of the edge knurls is varied from a minimum near the end of the web which is attached to a core during winding to a maximum near the end of the web which is at the outer surface of the completed roll. In a specific embodiment, such a change in compressibility is provided by varying the radial thickness of the edge knurl as the diameter of the winding roll increases. The thickness of the edge knurl is reduced slowly or tapered as the roll is wound. For example, in a web of triacetate film base such as used in various photographic products, a web having a nominal thickness of 0.005 inch (0.0127 cm) near the core of the roll might be wound with a knurl thickness of 0.008 inch (0.0203 cm) near the core, which would be reduced linearly or non-linearly to a final knurl thickness of 0.0055 inch (0.0139 cm) at the outside of the completed roll. In such a roll, this would provide a significant enough buildup of the edge knurls near the core to minimize the recognized quality problems, but would also prevent an excessive buildup of the edge knurls near the outside of the winding roll, thus minimizing the additional quality problems, essentially without regard to the width and length of the web or to the tension applied during winding.

Figure 2:
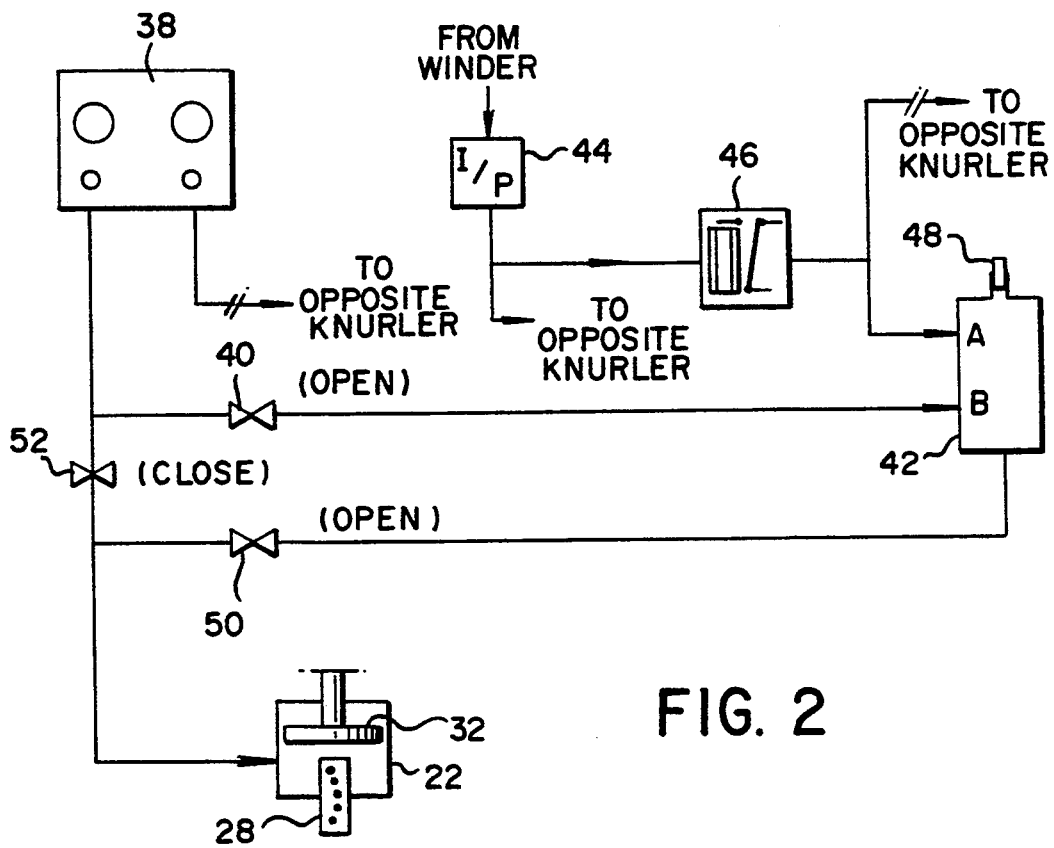
FIG. 2 shows a schematic pneumatic control circuit useful with the apparatus of FIG. 1.
Figure 3:
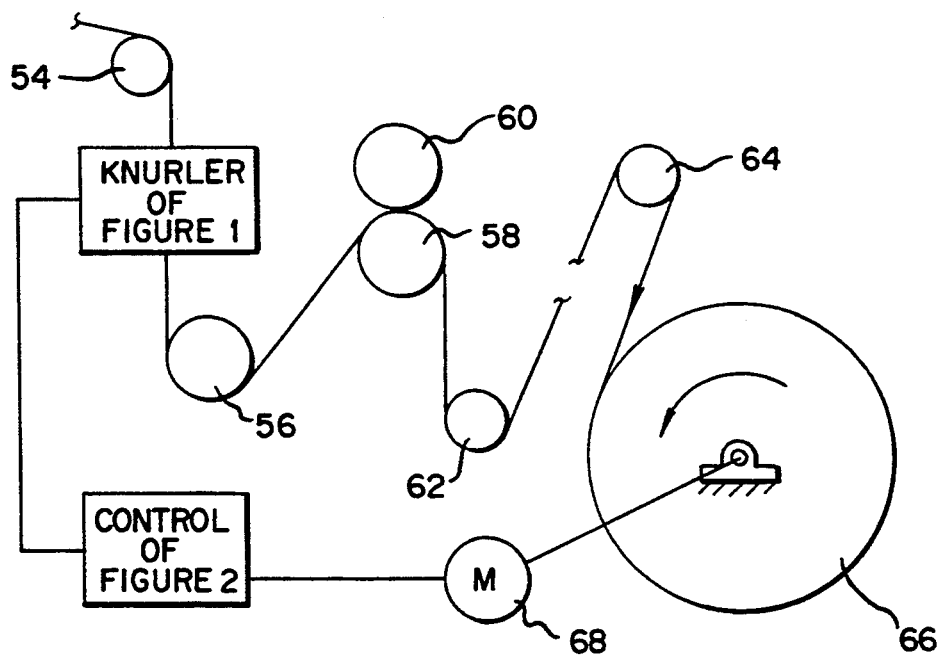
FIG. 3 shows schematically a web knurling and winding system embodying the apparatus of FIGS. 1 and 2.

FIG. 2 illustrates a pneumatic control circuit for an apparatus of the type shown in FIG. 1 which enables the apparatus to operate in accordance with the invention. FIG. 3 illustrates schematically a web winding apparatus comprising the knurler of FIG. 1 and the control circuit of FIG. 2. As in a conventional knurling apparatus, a pneumatic pressure controller 38 is provided which produces a baseline pressure that can be used to produce edge knurls of constant compressibility. In accordance with the invention, this pressure passes a normally open valve 40 and is introduced to port B of a conventional pneumatic computing relay 42, such as a Model 22 computing relay made by the Fairchild Company located in Winston-Salem, N.C. At the same time, an electrical signal proportional to the tension being applied to the web during winding is applied to a conventional current to pneumatic transducer 44, such as a Type 1000 I/P Transducer made by Bellofram Corp. located in Burlington, Mass. In this example, the winding tension applied to the web is reduced as the diameter of the wound roll grows, to minimize creation of defects due to the winding process. The pressure from transducer 44 passes to a conventional pneumatic ratio relay 46, such as a Model 29 Ratio Relay also made by the Fairchild Company, which can be used to amplify or reduce the pressure from transducer 44, depending on the operating ranges of transducer 44, computing relay 42 and cylinder 30 necessary to produce the particular knurling height desired. The output pressure from relay 46 is introduced to port A of relay 42. The pressures from relay 42 and controller 38 are added by relay 42 and the sum pressure may be biassed, in a manner typical for such relays, by changing the position of adjustment screw 48 of relay 42. The resultant pressure is then passed through a normally open valve 50 and admitted to the head end of piston 32 to cause the knurling wheels 20, 28 to engage edge 36. Because the signal to transducer 44 decreases as the winding tension drops, the pressure applied to knurling wheels 20, 28 will decrease in proportion, causing the height of the knurls to decrease along the length of the web. Valve 52 is closed during operation to produce knurls of varying height; however, it would be opened and valves 40, 50 would be closed to produce knurls of constant height.

As shown in FIG. 3, to reach the knurler of FIG. 1, the unknurled web passes over an idler roll 54; and, following knurling, the knurled web passes around an idler roll 56, over a driven roll 58 and beneath a pressure roll 60, around two or more idler rolls 62, 64 and on to the roll 66 being wound. As indicated schematically, roll 66 is rotated by a motor 68 whose drive current is a function of the tension applied to the web during winding, as will be understood by those skilled in the art.

Figure 4:
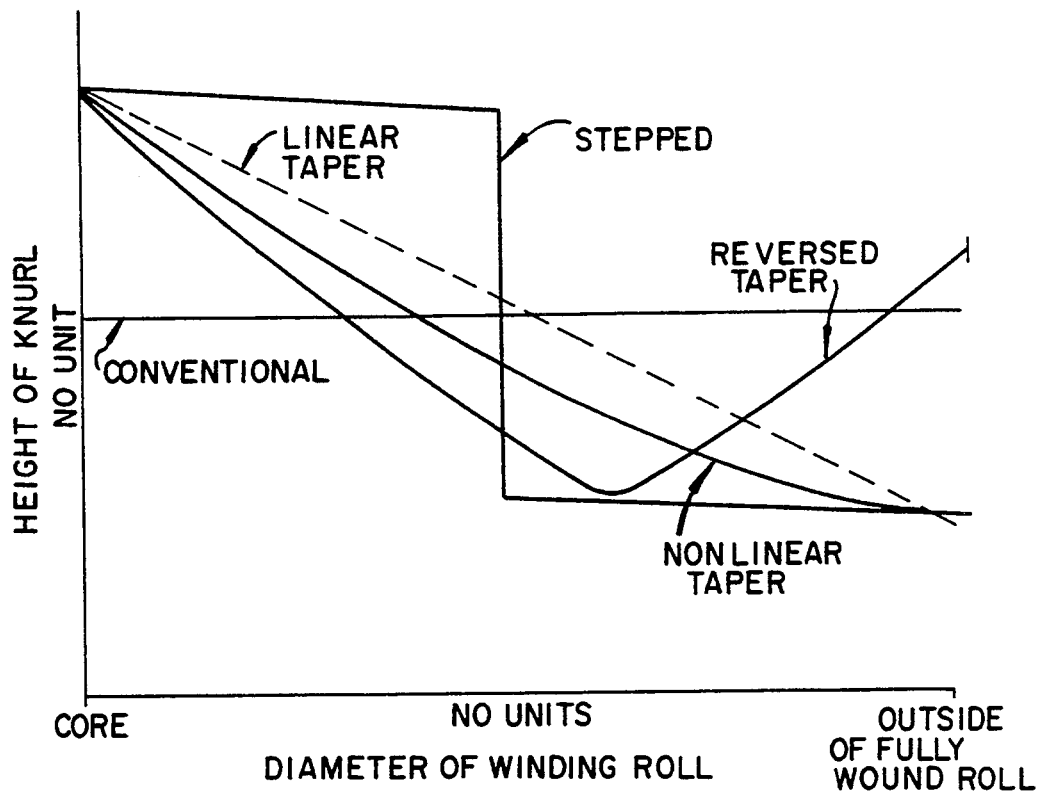
FIG. 4 shows a plot of edge knurls heights as a function of wound roll diameter, indicating qualitatively how the height can be varied in various predetermined manners in accordance with the invention, to produce the desired effective height.

Though the embodiment of the invention shown in FIGS. 1 and 2 provides for controlling knurling pressure as a function of tension applied during winding, it is also within the scope of the invention to control the knurling pressure without reference to the winding tension, to produce different patterns of compressibility along the roll. For example, FIG. 4 illustrates how the effective height would decrease almost linearly using the control of FIG. 2 in cases where the winding tension decreases linearly. Alternatively, a conventional programmable pressure controller, such as a Distributed Process Control System, MOD 300 made by Asea-Brown Boveri located in Columbus, Ohio, not illustrated, could be used to vary the pressure acting on piston 32 to vary the effective height of the edge knurls in a wide variety of predetermined manners. Such a system could reference the length of web in the wound roll, rather than the winding tension. For example, such a controller could produce a stepped change in knurl height from an initial relatively high level to a final substantially lower level. Similarly, such a programmable controller could be used to vary the pressure on piston 32 to cause a nonlinear taper. In situations where a roll is to be unwound for treatment such as application of a coating and then rewound from the other end, the programmable controller could be used to provide a reverse taper at the end which initially is at the outside of the roll to aid in the rewinding of the web.

Figure 5:
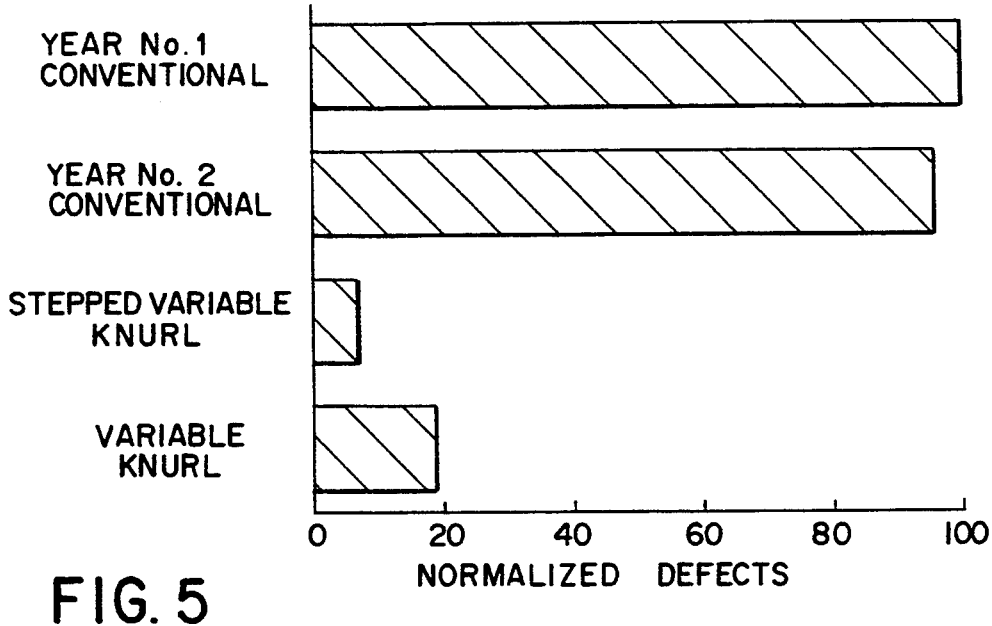
FIG. 5 shows a bar chart indicating reduction in defects due to winding when the apparatus of FIG. 1 is controlled by the pneumatic circuit of FIG. 2.

FIG. 5 shows the dramatic decrease in normalized defects which has been achieved when webs are knurled in accordance with the invention. In the following data, knurl heights are as measured prior to winding. The bus for the two conventional years are based on an 8000 foot (2438 m) web having a width of 50 to 60 inches (127 to 152 cm), a thickness of 0.005 to 0.006 inch (0.010 to 0.015 cm) and a constant height knurling pattern of about 0.0078 inch (0.0198 cm). By "normalized defects" is meant that the conventional defect level was highest in year #1; and the defect levels for the other cases were normalized by dividing their defect rate by the rate for year #1. When several hundred rolls of the same types of webs were provided with a variable knurl which started at height of 0.0085 to 0.0095 inch (0.0215 to 0.0240 cm) and tapered to a height of 0.0068 to 0.0073 inch (0.017 to 0.0185 cm), normalized defects were reduced by a factor of about five. When fifty to sixty rolls of the same types of webs were provided with a stepped variable knurl of the same thickness range, normalized defects were reduced by a factor of about ten.

Although the knurling produced by the apparatus of FIGS. 1 and 2 is cold embossed, those skilled in the art will realize that other knurling techniques also could be used in accordance with the invention, such as hot knurling, ultrasonic knurling, laser knurling and the like. For example, ultrasonic knurling apparatus of the type shown in U.S. Pat. No. 4,247,273 can be used in accordance with the invention to change the height of a fixed knurl pattern.

Figure 6:
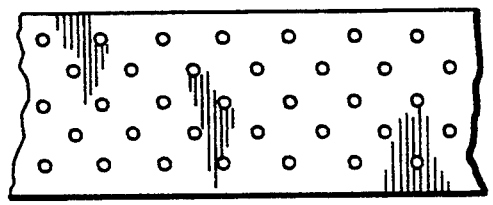
FIGS. 6 to 9 show schematically patterns of edge knurls having different densities of the knurl features, thereby producing different levels of compressibility.
Figure 7:
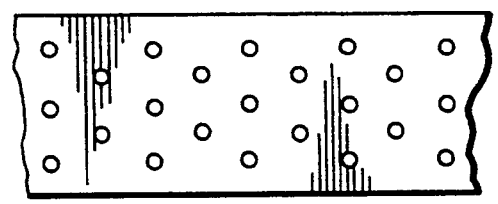
Figure 8:
Figure 9:
Figure 10:
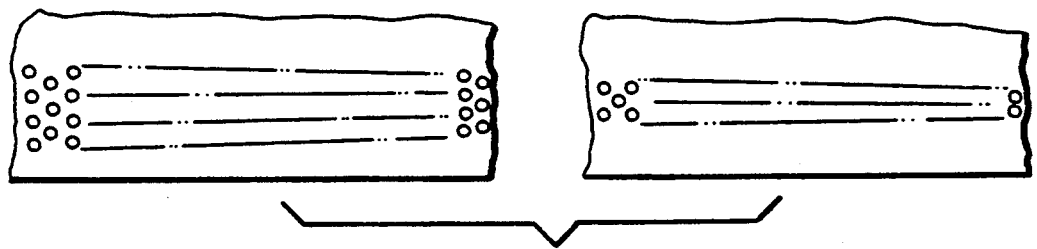
FIG. 10 shows schematically a fixed density knurl having a tapered width, thereby producing different levels of compressibility.

The apparatus of FIGS. 1 and 2 is effective to change the compressibility of the knurling by changing the height of the knurling pattern above the web along the length of the web. However, compressibility can also be varied by changing the density of the knurling pattern longitudinally or transversely of the web, or both; by changing the transverse width of the knurling pattern; or by a combination of these effects. For example, laser knurling techniques of the general type disclosed in U.S. Pat. No. 4,942,000 can be used in accordance with the present invention to change the height and/or density of the knurling pattern either longitudinally or transversely, or both, with corresponding changes in compressibility of the knurling pattern. FIGS. 6 and 8 show plan and edge views of an edge knurl having a regular spiral pattern of knurl features, such as can be readily produced using laser knurling techniques. In contrast, FIGS. 7 and 9 show plan and edge views of a less dense, or more sparse, pattern of such knurl features. By changing the density of such patterns, the compressibility of the pattern can be changed proportionately. FIG. 10 illustrates, how the transverse width of a fixed density knurling pattern can be tapered from one end of the web to the other.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for providing on a web of sheet material an edge knurl which varies longitudinally in effective height along the length of said web, comprising:
    means for conveying a web having longitudinal edges and sides along a path;
    means for applying to said longitudinal edges on at least one of said sides of said web at least one longitudinally extending pattern of regions having a pattern height extended past the surface of the remainder of said web;
    means for controllably varying said means for applying to cause the compressibility and, hence, said effective height of said regions to vary in a predetermined manner along the length of said web after winding; and
    means for winding said web into a roll following application of said pattern, said web having an inner end and an outer end.

2. Apparatus according to claim 1, wherein said pattern is continuous.

3. Apparatus according to claim 1, wherein said pattern is intermittent.

4. Apparatus according to claim 1, wherein said compressibility is varied by varying said pattern height, said pattern after winding having a maximum effective height near said inner end of said web and tapering to a minimum effective height near said outer end of said web.

5. Apparatus according to claim 4, wherein said pattern tapers linearly.

6. Apparatus according to claim 4, wherein said pattern tapers non-linearly.

7. Apparatus according to claim 4, wherein said pattern tapers discontinuously.

8. Apparatus according to claim 1, wherein said means for applying comprises a pair of patterned drums at each said longitudinal edge, one drum on each side of said web; and said means for controllably varying presses said drums into contact with said web with changing force to vary said pattern height.

9. Apparatus according to claim 8, wherein said means for winding comprises means for reducing the tension applied to the web as winding progresses and said means for controllably varying reduces the pressure on said drums in response to reduction in said tension.

10. Apparatus according to claim 1, wherein said means for applying comprises a laser knurler.

11. Apparatus according to claim 10, wherein said pattern has a maximum width near said inner end and tapers to a minimum width near said outer end.

12. Apparatus according to claim 1, wherein said means for applying comprises an ultrasonic knurler.

13. Apparatus according to claim 12, wherein after winding said pattern has a maximum effective height near said inner end and tapers to a minimum effective height near said outer end.

14. An article of manufacture comprising:
a roll of web material having longitudinal sides and edges and an inner end and an outer end in said roll; and
along said longitudinal edges on at least one of said sides, at least one longitudinally extending pattern of regions having a pattern height extended past the surface of the remainder of said web, the compressibility and, hence, the effective height of said regions varying along the length of said web in a controlled, predetermined manner after winding.

15. An article of manufacture according to claim 14, wherein said pattern is continuous.

16. An article of manufacture according to claim 14, wherein said pattern is intermittent.

17. An article of manufacture according to claim 14, wherein said pattern has a maximum effective height near said inner end and tapers to a minimum effective height near said outer end.

18. An article of manufacture according to claim 17, wherein said pattern tapers linearly.

19. An article of manufacture according to claim 18, wherein said pattern has a maximum width near said inner end and tapers to a minimum width near said outer end.

20. An article of manufacture according to claim 17, wherein said pattern tapers non-linearly.

21. An article of manufacture according to claim 20, wherein said pattern has a maximum width near said inner end and tapers to a minimum width near said outer end.

22. An article of manufacture according to claim 17, wherein said pattern is tapered.

23. An article of manufacture according to claim 22, wherein said pattern has a maximum width near said inner end rand tapers to a minimum width near said outer end.

24. A method for providing knurls of varying effective height longitudinally along at least one edge of a web of sheet material, comprising the steps of:
conveying a web having longitudinal edges and sides along a path;
applying to said longitudinal edges on at least one side of said web at least one longitudinally extending pattern of regions having a pattern height extended past the surface of the remainder of said web, while controllably varying the compressibility and, hence, said effective height of said regions along the length of said web in a predetermined manner after winding; and
winding said web into a roll, said web having an inner end and an outer end in said roll.

25. A method according to claim 24, wherein said pattern is continuous.

26. A method according to claim 24, wherein said pattern is intermittent.

27. A method according to claim 24, wherein said pattern has a maximum effective height near said inner end and tapers to a minimum effective height near said outer end.

28. A method according to claim 27, wherein said pattern tapers linearly.

29. A method according to claim 28, wherein said pattern has a maximum width near said inner end and tapers to a minimum width near said outer end.

30. A method according to claim 27, wherein said pattern tapers non-linearly.

31. A method according to claim 30, wherein said pattern has a maximum width near said inner end and tapers to a minimum width near said outer end.

32. A method according to claim 27, wherein said pattern is tapered discontinuously.

33. A method according to claim 32, wherein said pattern has a maximum width near said inner end and tapers to a minimum width near said outer end.

34. A method according to claim 24, further comprising the steps of:
providing a pair of patterned drams at each of said longitudinal edges, one drum on each side of said web; and
pressing said drams into contact with said web with changing force to vary said effective height.

35. A method according to claim 34, further comprising the steps of:
reducing the tension applied to said web as winding progresses; and
reducing the pressure on said drums in response to reduction in said tension.

36. A method according to claim 24, wherein said applying step is accomplished using a laser.

37. A method according to claim 24, wherein said applying step is accomplished using ultrasonic energy.

38. An article of manufacture according to claim 14, wherein said pattern height of said regions varies to change said compressibility in said predetermined manner.

39. An article of manufacture according to claim 14, wherein a width of said regions varies to change said compressibility in said predetermined manner.

40. A method for providing knurls according to claim 24, wherein said compressibility of said regions is varied by varying said pattern height of said regions.

41. A method for providing knurls according to claim 24, wherein said compressibility of said regions is varied by varying the width of said regions.

* * * * *